United States Patent
Mager et al.

(10) Patent No.: US 10,091,681 B2
(45) Date of Patent: Oct. 2, 2018

(54) MOBILE TERMINALS AND METHODS FOR PERFORMING A MEASUREMENT

(71) Applicant: Intel IP Corporation, Santa Clara, CA (US)

(72) Inventors: Stefan Mager, Nuremberg (DE); Stefan Meyer, Hoechstadt (DE)

(73) Assignee: Intel IP Corporation, Santa Clara, CA (US)

( * ) Notice: Subject to any disclaimer, the term of this patent is extended or adjusted under 35 U.S.C. 154(b) by 130 days.

(21) Appl. No.: 14/474,333

(22) Filed: Sep. 2, 2014

(65) Prior Publication Data

US 2015/0071101 A1    Mar. 12, 2015

(30) Foreign Application Priority Data

Sep. 9, 2013   (DE) .................. 10 2013 109 816

(51) Int. Cl.
  *H04W 72/12*  (2009.01)
  *H04W 24/10*  (2009.01)
  *H04W 36/00*  (2009.01)
  *H04W 64/00*  (2009.01)

(52) U.S. Cl.
  CPC ........ *H04W 24/10* (2013.01); *H04W 36/0094* (2013.01); *H04W 64/006* (2013.01)

(58) Field of Classification Search
  CPC .. H04W 72/12; H04W 72/1278; H04W 74/04
  USPC ........................................ 370/314
  See application file for complete search history.

(56) References Cited

U.S. PATENT DOCUMENTS

| | | |
|---|---|---|
| 2009/0047958 A1 | 2/2009 | Rimhagen et al. |
| 2010/0111042 A1* | 5/2010 | Chou ............... H04W 36/30 370/332 |
| 2011/0105122 A1* | 5/2011 | Wu .................. H04W 36/0083 455/436 |
| 2012/0113866 A1 | 5/2012 | Tenny et al. |
| 2012/0184290 A1 | 7/2012 | Kazmi et al. |
| 2012/0190373 A1 | 7/2012 | Tenny |
| 2012/0252487 A1 | 10/2012 | Siomina et al. |
| 2013/0059610 A1 | 3/2013 | Siomina et al. |

OTHER PUBLICATIONS

3GPP TS 36.214, 3rd Generation Partnership Project; "Technical Specification Group Radio Access Network; Evolved Universal Terrestrial Radio Access (E-UTRA); Physical layer; Measurements" Release 10, V10.1.0, (Mar. 2011), 13 pages.

(Continued)

*Primary Examiner* — Andrew W Chriss
*Assistant Examiner* — Kenan Cehic
(74) *Attorney, Agent, or Firm* — Viering, Jentschura & Partner mbB

(57) ABSTRACT

A mobile terminal is described comprising a detector configured to detect an event which may trigger a change of a measurement gap configuration for the mobile terminal; a determiner configured to determine, upon detecting the event, whether the measurement gap configuration for the mobile terminal after the event is suitable for a measurement to be performed; and a signaling circuit configured to request a measurement gap reconfiguration if the measurement gap configuration is not suitable for the measurement.

5 Claims, 13 Drawing Sheets

(56) References Cited

OTHER PUBLICATIONS

3GPP TS 36.331, 3rd Generation Partnership Project; "Technical Specification Group Radio Access Network; Evolved Universal Terrestrial Radio Access (E-UTRA); Radio Resource Control (RRC); Protocol specification" Release 10, V10.6.0, (Jun. 2012), 302 pages.
3GPP TS 36.331, 3rd Generation Partnership Project; "Technical Specification Group Radio Access Network; Evolved Universal Terrestrial Radio Access (E-UTRA); Radio Resource Control (RRC); Protocol specification" Release 10, V10.10.0, (Jun. 2013), 307 pages.
3GPP TS 36.355, 3rd Generation Partnership Project; "Technical Specification Group Radio Access Network; Evolved Universal Terrestrial Radio Access (E-UTRA); LTE Positioning Protocol (LPP)" Release 10, V10.9.0, (Jun. 2013), 118 pages.
Office action received for German patent Application No. 10 2013 109 816.9, dated Jan. 22, 2014, 8 pages of office action and 7 pages of English translation.
3GPP TS 36.133, 3rd Generation Partnership Project; "Technical Specification Group Radio Access Network; Evolved Universal Terrestrial Radio Access (E-UTRA); Requirements for support of radio resource management" Release 10, V10.11.0, (Jul. 2013), 702 pages.

\* cited by examiner

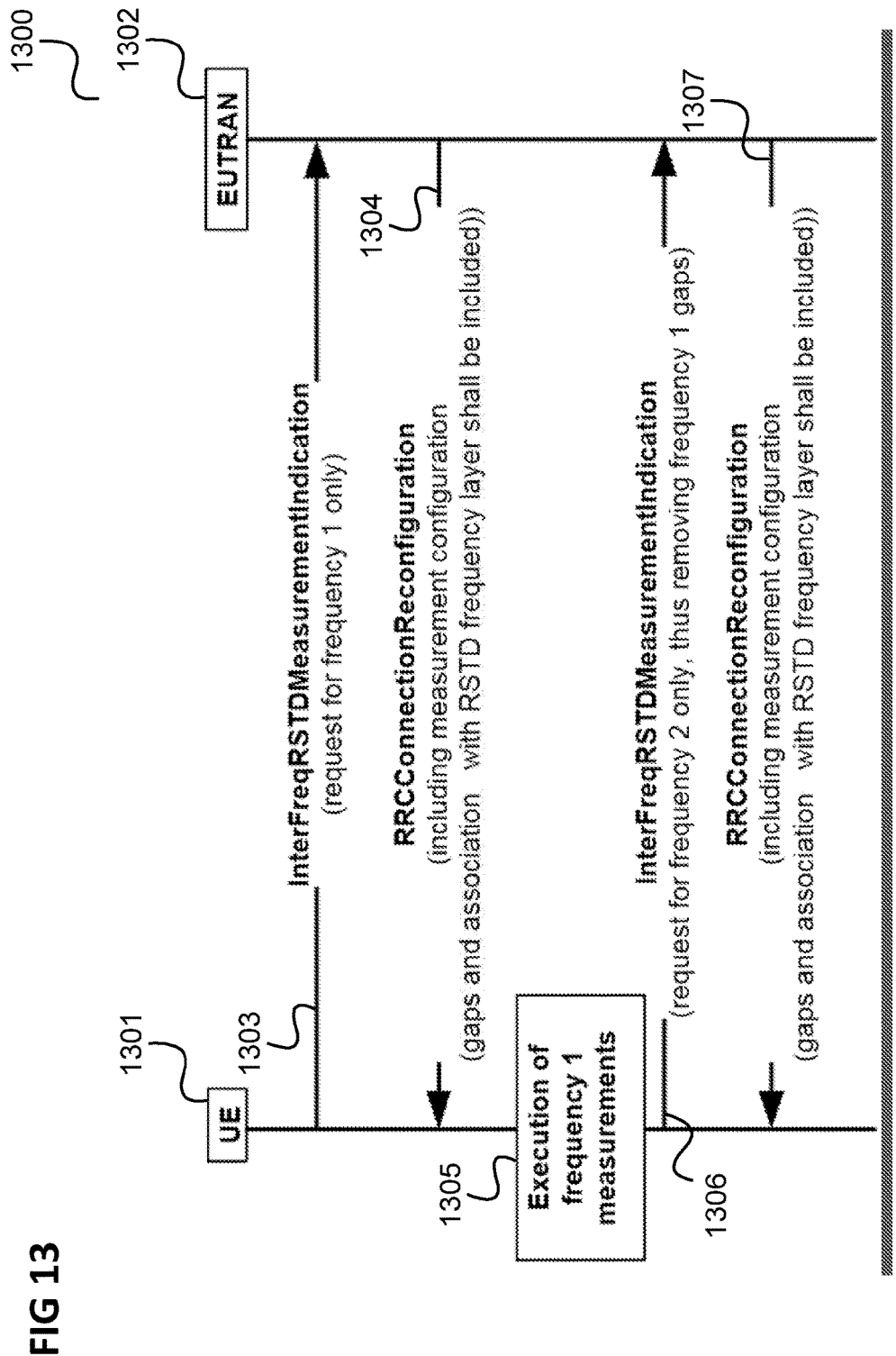

MOBILE TERMINALS AND METHODS FOR PERFORMING A MEASUREMENT

CROSS-REFERENCE TO RELATED APPLICATION

This application claims priority to German Patent Application Serial No. 10 2013 109 816.9, which was filed Sep. 9, 2013, and is incorporated herein by reference in its entirety.

TECHNICAL FIELD

Embodiments described herein generally relate to mobile terminals and methods for performing a measurement.

BACKGROUND

A mobile terminal typically performs measurements on its serving radio cell and neighboring radio cells for various purposes such as handover or positioning. For example, in case of an LTE OTDOA (Observed Time Difference of Arrival) measurement intra frequency measurements and inter frequency may be performed. For the inter frequency measurements, measurement gaps are used to allow the mobile terminal to perform the measurements. Typically, there is no connection between a mobile terminal's serving base station and the Positioning server to allow coordination with respect to measurement gap allocation for the purpose of OTDOA measurements. Accordingly, efficient approaches for managing measurements gaps for measurements such as reference signal time difference (RSTD) measurements for an OTDOA measurement are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 13 shows a message flow diagram illustrating an example for an OTDOA measurement process in which the mobile terminal requests measurement gaps for different frequencies separately.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
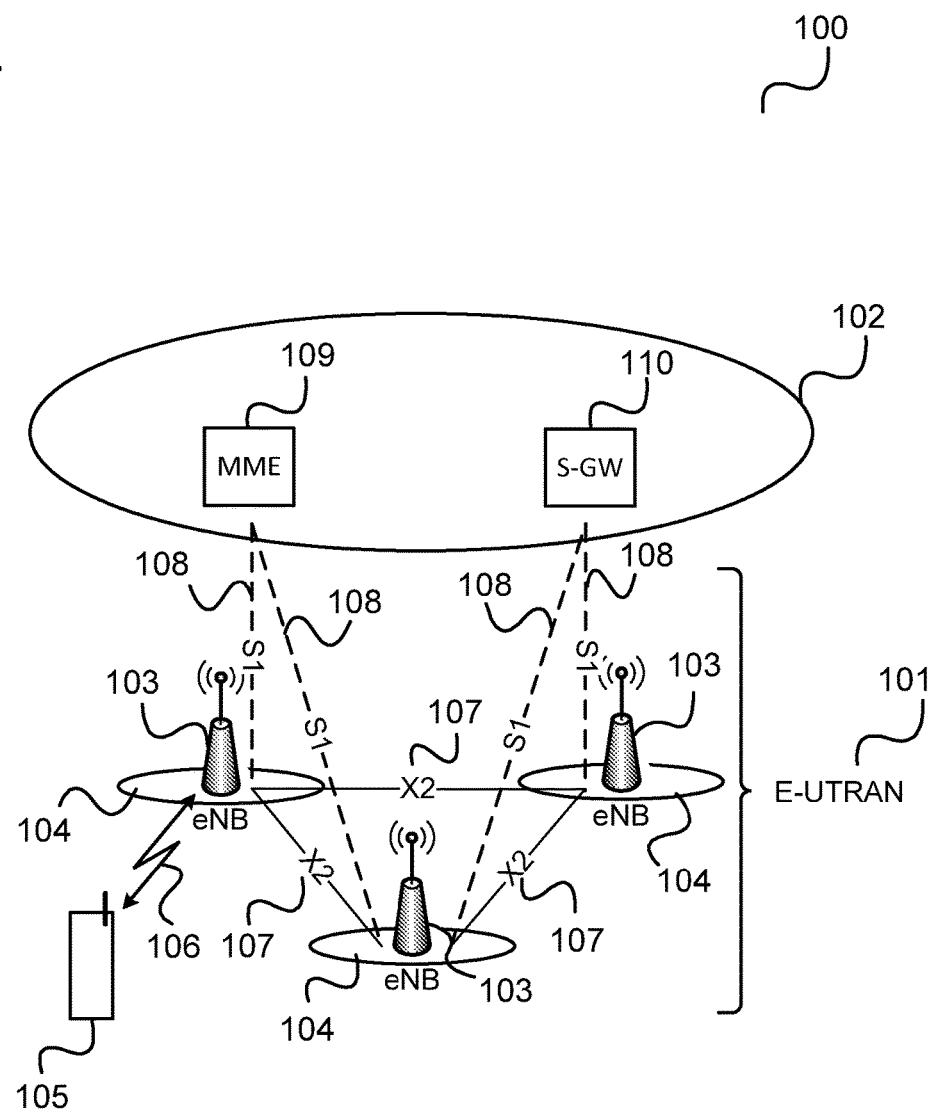
FIG. 1 shows a communication system according to a mobile communication standard such as LTE.

FIG. 1 shows a communication system 100.

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to a mobile standard such as LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pica cells, small cells, open cells, closed subscriber group cells, hybrid cells, for instance according to LTE, or LTE-Advanced).

A mobile terminal (e.g. UE) 105 located in a mobile radio cell 104 may communicate with the core network 102 and with other mobile terminals 105 via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the LTE air interface 106 different duplex methods, such as FDD (Frequency Division Duplex) or TDD (Time Division Duplex), may be deployed.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

To determine the geographical position of the mobile terminal 105, it may perform an Observed Time Difference Of Arrival (OTDOA) measurement. For example, a positioning server is requesting the mobile terminal 105 to perform a OTDOA measurement and calculate from it the position of the mobile terminal 105. An OTDOA is the time interval that is observed by the mobile terminal 105 between the reception of downlink signals (in the following referred to as positioning signals) from two (or more) different cells 104. If a positioning signal from a first cell 104 is received at the moment $t_1$, and a positioning signal from a second cell 104 is received at the moment $t_2$, the OTDOA is $t_2-t_1$. An OTDOA measurement or OTDOA derivation is, e.g. according to LTE, based on a set of RSTD (Reference Signal Time Difference) measurements by the mobile terminal 105. Thus, e.g. according to LTE, in case an OTDOA measurement is to be done RSTD needs to be performed.

The mobile terminal can perform Inter-frequency RSTD measurements, which for example involve reception of a positioning signal from a radio cell operating on a different frequency than the mobile terminal's serving cell, only in measurement gaps. If these measurement gaps are not configured by the network side (e.g. the E-UTRAN 101) at the time of the positioning signal (or positioning reference signal (PRS)) to be received, the measurements is not possible. This issue may be addressed by the mobile terminal 105 informing the network side about the times at which the measurements are possible. According to Rel.10 of the LTE RRC specification, a request procedure has been introduced in view of this issue. The mobile terminal 105 can use this procedure to request the allocation and deallocation gaps for inter frequency measurements. Specifically, the mobile terminal 105 may send an InterFreqRSTDMeasurementIndication message to the EUTRAN 101.

However, the introduction of this procedure can be seen to address only parts of the above issue while others remain as explained in the following.

One Time Check of the GAP Requirements and Sending of Request:

According to e.g. 3GPP, the mobile terminal 105 checks if the currently configured measurement gaps are sufficient for the OTDOA measurement only when a new OTDOA measurement request (for the mobile terminal 105 to perform an OTDOA measurement) is received. Following this check, the mobile terminal 105 generates the InterFreqRSTDMeasurementIndication message only once.

However, in case the check of the measurement gap configuration leads to a decision that no new gaps are required the request procedure is not started. This means that the network side is not informed about the usage of measurement gaps for RSTD inter frequency measurements. In case the network side later decides to remove or reconfigure the measurement gaps (e.g., if the quality of the connection to the serving cell improves and the network side disables the measurement of reception quality of neighboring cells) the previously possible inter frequency measurements might no longer be possible (e.g. the gap period could be too long, the gap offset might not fit to the PRS pattern or gaps could be switched off). An example for this is illustrated in FIG. 2.

Figure 2:
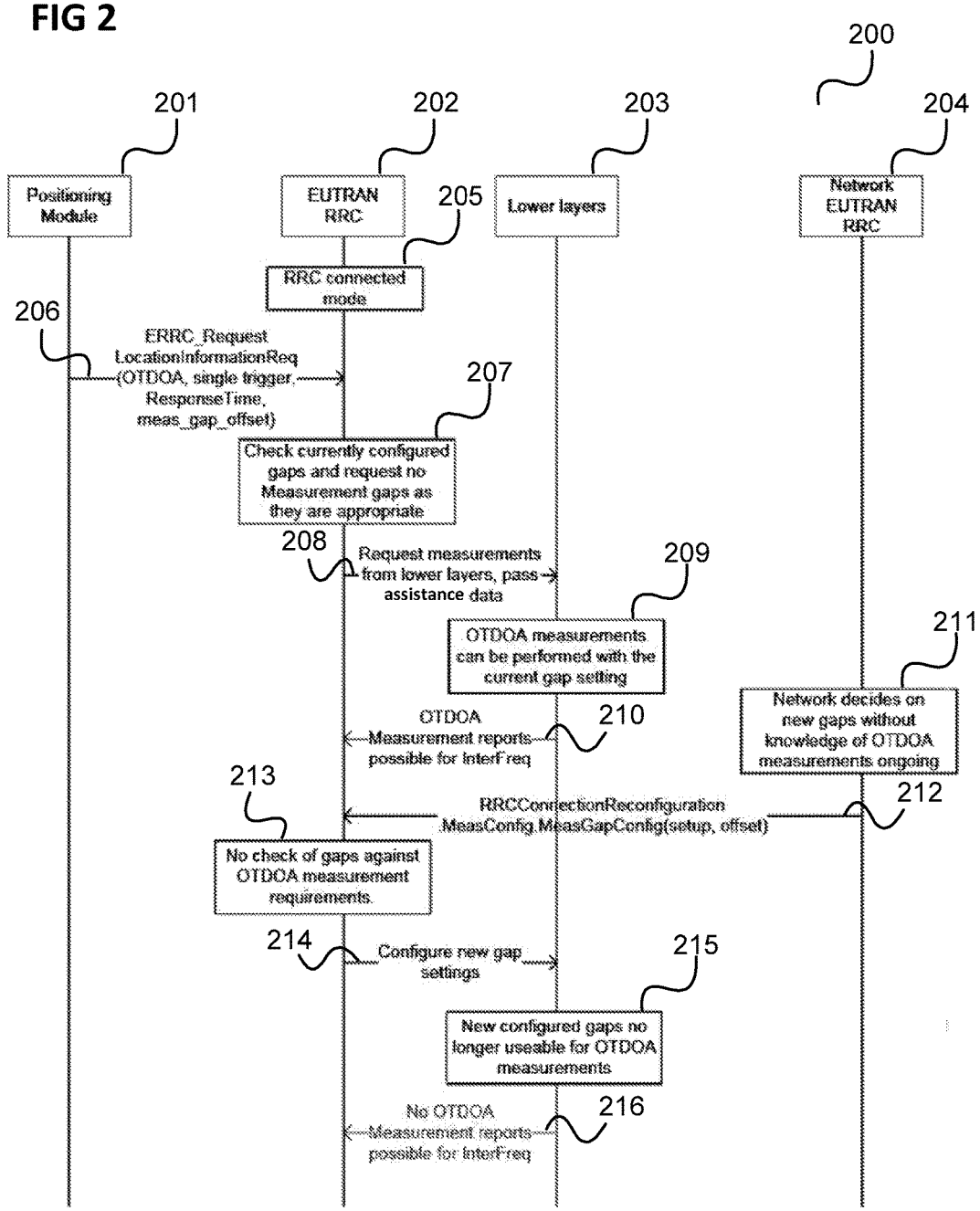
FIG. 2 shows a message flow diagram illustrating an example for an OTDOA measurement process.

FIG. 2 shows a message flow diagram 200.

The message flow takes place between a positioning module 201, e.g. of the mobile terminal 105, a first RRC (Radio Resource Control) entity 201 which is for example an entity of the RRC layer of the mobile terminal 105, lower layer entities 203, which are for example entities of the data link layer or the physical layer of the mobile terminal 105, and a second RRC entity 204 which is for example an entity of the RRC layer of the E-UTRAN 101.

It is assumed that in 205 the first RRC entity 202 is in RRC connected mode.

In 206, the positioning module 201 sends a positioning request to the first RRC entity.

In 207, the first RRC entity 202 checks whether the currently configured gaps are suitable for the OTDOA measurement. In this example, it is assumed that the measurement gaps are suitable. Accordingly, the first RRC entity 202 does not request measurement gaps from the network side.

In 208, the first RRC entity 202 requests the lower layer entities 203 to carry out the OTDOA measurement.

In 209, the lower layer entities carry out RSTD measurements with the current measurement gap setting and report the results to the first RRC entity in 210.

It is assumed that at some point in time, in 211, the second RRC entity 204 decides to change the measurement gap configuration and sends a corresponding RRCConnectionReconfiguration message in 212.

According to e.g. 3GPP Rel. 10, the first RRC entity 202 does not check whether the changed gaps are suitable for the OTDOA measurement in 213 but configures the lower layer entities 203 with the new measurement gap configuration in 214.

In 215, the lower layer entities 203 can no longer perform RSTD measurements and can no longer report measurement results to the first RRC entity 202 in 216.

Furthermore, in case a handover to another cell is triggered for the mobile terminal 105, the measurement gap configuration might change as well. In this case, similarly to the case illustrated in FIG. 2, it may occur that OTDOA measurement may no longer be carried out. This may occur whether or not the initial check as in 207 in FIG. 2 results in gap requests in case the requested gaps are not transferred between the current serving base station and the serving base station after handover. This is illustrated in FIG. 3.

Figure 3:
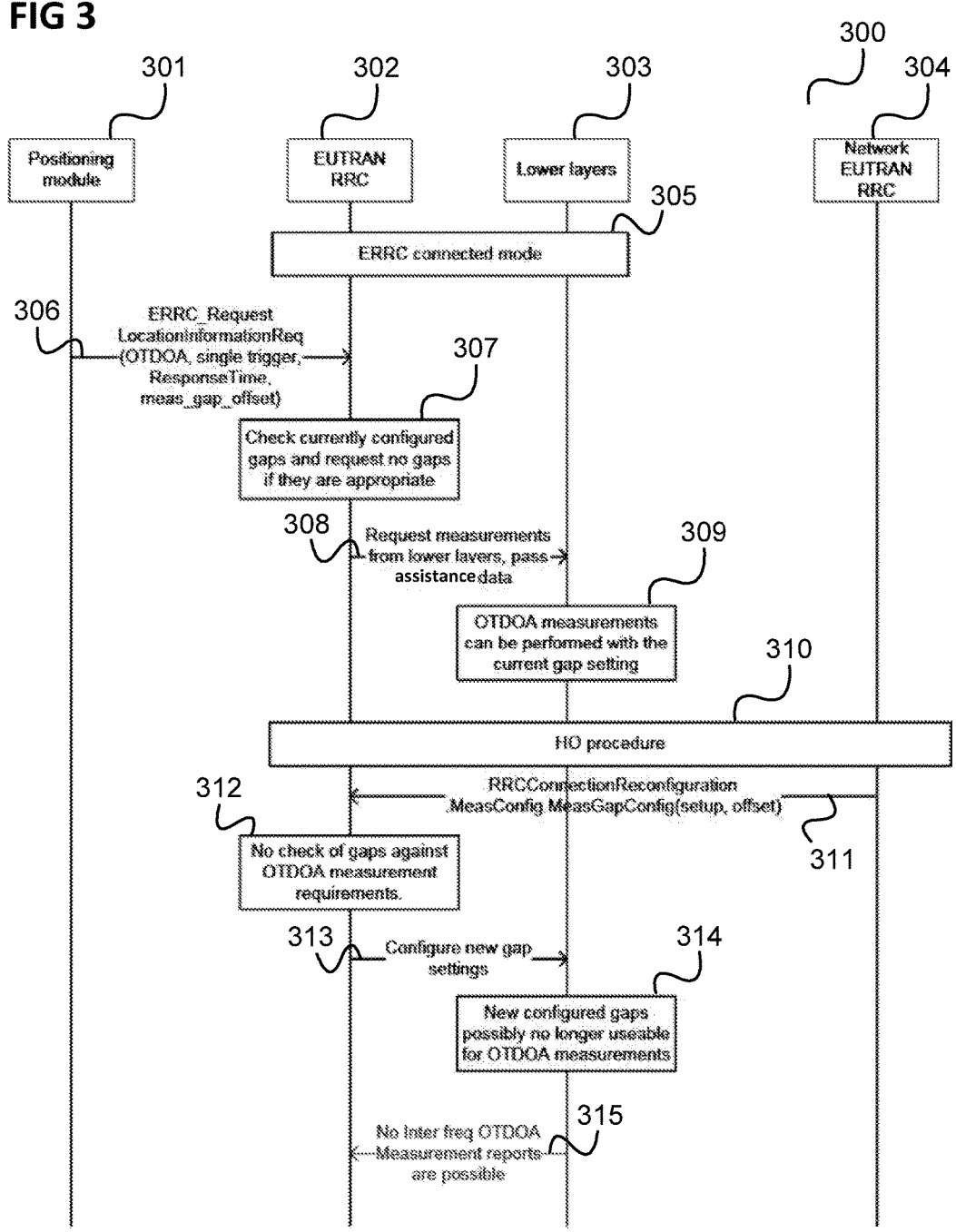
FIG. 3 shows a message flow diagram illustrating a further example for an OTDOA measurement process.

FIG. 3 shows a message flow diagram 300.

Similarly to FIG. 2, the message flow takes place between a positioning module 301, e.g. of the mobile terminal 105, a first RRC (Radio Resource Control) entity 302 which is for example an entity of the RRC layer of the mobile terminal 105, lower layer entities 303, which are for example entities of the data link layer or the physical layer of the mobile terminal 105, and a second RRC entity 304 which is for example an entity of the RRC layer of the E-UTRAN 101.

305 to 309 are performed as 205 to 209 as explained above with reference to FIG. 2.

In this example, it is assumed that in some point in time, in 310, a handover procedure is carried out and that as a result, the measurement configuration changes. For example, after the handover, the connection quality for the mobile terminal 105 has become good enough and thus the network side does not configure any measurement gaps for neighbor cell measurements.

In 311, the second RRC entity 304 in 211 sends a RRCConnectionReconfiguration message to the first RRC entity 302 with an indication of the changed measurement gap configuration.

According to e.g. 3GPP Rel. 10, the first RRC entity 302 does not check whether the changed gaps are suitable for the OTDOA measurement in 312 but configures the lower layer entities 303 with the new measurement gap configuration in 313.

In 314, the lower layer entities 303 can no longer perform RSTD measurements and can no longer report measurement results to the first RRC entity 302 in 316.

Lack of Correlation of Inter Frequency Gaps with Different Frequencies for Measurements:

The mobile terminal 105 can request RSTD (reference signal time difference, such as for an OTDOA measurement) measurement gaps for several inter frequencies in one message. Following the request for RSTD gaps the network side may allocate gaps to the mobile terminal 105. The network side cannot specifically assign certain gaps to certain inter-frequencies at the same time. Radio cells operating on different frequencies may use different parameters for the positioning reference signal configuration. The network allocates a common pattern for all inter-frequencies However, the network side does not know when the mobile terminal has finished measurements for one or more frequencies. Accordingly, according to e.g. 3GPP Rel 10, the allocation of the measurement gaps is retained until all available measurement reports for the OTDOA measurement have been sent (e.g. if the OTDOA measurement is complete or a timer has expired) and the network is informed with a gap stop request. This may lead to an unnecessary reduction of network capacity due to a gap allocation that is not optimal.

Lack of Interworking Between Base Stations with Respect to Gap Patterns:

According to e.g. 3GPP Rel 10, it is not specified how the requests shall be handled between different base stations in case of handover or cell reselection. However, in case of a handover the gaps configured by the new serving base station may no longer be sufficient for inter frequency RSTD measurements since there is typically no alignment between different base stations.

RSTD Priority Handling:

According to e.g. 3GPP Rel 10, a provideAssistanceData message for providing assistance data (such as a list of cells for which the PRS should be measured and their PRS parameters, including BW, periodicity etc) the positioning server also provides the priority and order in which the RSTD measurements are to be performed. This information is grouped in cells belonging to the same frequency. This means that all cells belonging to one certain frequency have higher priority than cells belonging to a different frequency. The time to measure the requested cells can be limited by the positioning server with the parameter responseTime.

However, the quality and duration of the OTDOA measurement depends on the quality of the received positioning reference signal. As the mobile terminal 105 is typically not allowed to digress from the measurement order given by the network this may lead to a case where cells with bad signal quality are tried to be measured before cells with good signal quality and the response time is not sufficient for the mobile terminal to measure and report the PRSs of cells with good quality. This situation can occur in case the information about the cell quality/measurement as received from the positioning server is not comprehensive or outdated and since the priority provided by the positioning server is typically not correlated to quality of cells seen by the mobile terminal.

In view of the above issues, as will be described in the following, a mobile terminal is provided that may be seen to extend the single gap request to a bidirectional interaction between network and mobile terminal with respect to gap handling.

Figure 4:
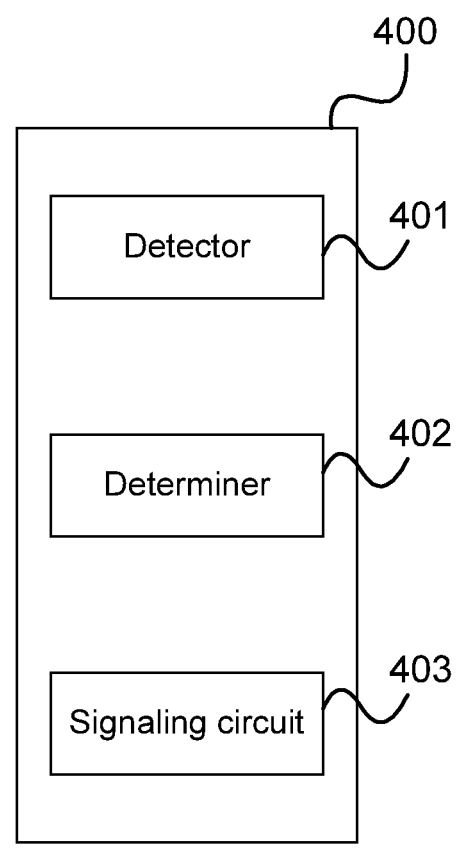
FIG. 4 shows a mobile terminal configured to detect an event which may trigger a change of the measurement gap configuration for the mobile terminal.

For example, a mobile terminal is provided as illustrated in FIG. 4.

FIG. 4 shows a mobile terminal 400.

The mobile terminal 400 includes a detector 401 configured to detect an event which may trigger a change of a measurement gap configuration for the mobile terminal 400 and a determiner 402 configured to determine, upon detecting the event, whether the measurement gap configuration for the mobile terminal after the event is suitable for a measurement to be performed.

The mobile terminal 400 further includes a signaling circuit 403 configured to request a measurement gap reconfiguration if the measurement gap configuration is not suitable for the measurement.

In other words, a mobile terminal is configured to determine whether the measurement configuration of a serving network might have changed and to check whether the possibly changed measurement configuration is still suitable for a certain measurement. Depending on the result, the mobile terminal requests a measurement gap reconfiguration from the serving network. For example, the mobile terminal checks the requirement for a measurement gap request each time the network environment is changing. A change in the network environment can be, among others, a handover to another cell or a RRC Connection Reestablishment.

Thus, the mobile terminal may for example request measurement gaps in the following cases:

1) The mobile terminal has not provided any measurement gap information at the start of an OTDOA measurement, because the configured gaps had been appropriate and they are changed later.

2) The measurement gaps are configured after a handover no longer or not suitable to perform an OTDOA measurement.

Figure 5:
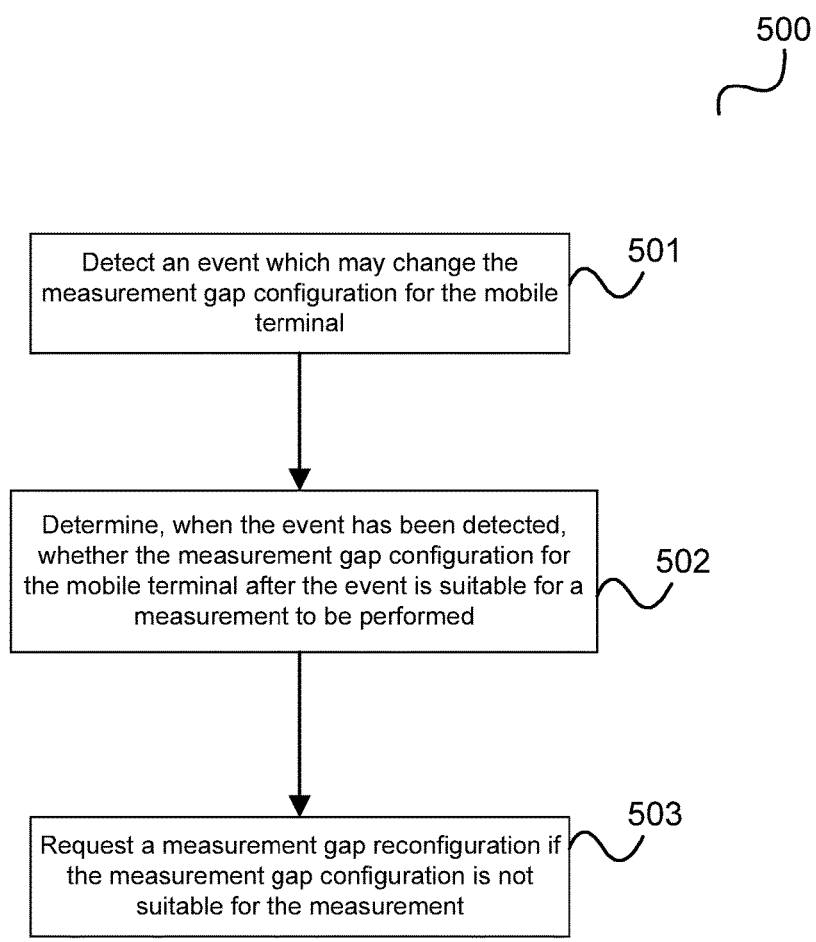
FIG. 5 shows a flow diagram illustrating a method for performing a measurement including detecting an event which may trigger a change of the measurement gap configuration for a mobile terminal.

The mobile terminal 400 for example carries out a method as illustrated in FIG. 5.

FIG. 5 shows a flow diagram 500.

The flow diagram 500 illustrates a method for performing a measurement, for example carried out by a mobile terminal.

In 501, the mobile terminal detects an event which may trigger a change of a measurement gap configuration for the mobile terminal.

In 502, the mobile terminal determines, upon detecting the event, whether the measurement gap configuration for the mobile terminal after the event is suitable for a measurement to be performed.

In 503, the mobile terminal requests a measurement gap reconfiguration if the measurement gap configuration is not suitable for the measurement.

Figure 6:
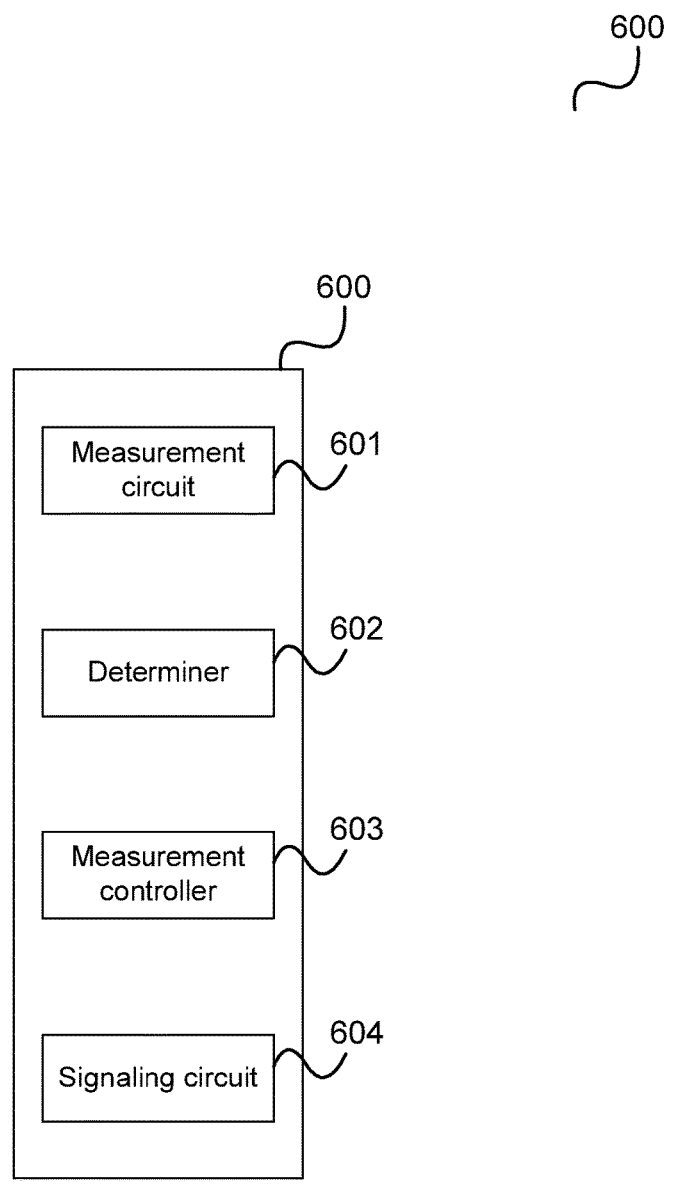
FIG. 6 shows a mobile terminal configured to communicate an association of measurements with measurement gaps with a network component.

According to another example, a mobile terminal is provided as illustrated in FIG. 6.

FIG. 6 shows a mobile terminal 600.

The mobile terminal 600 includes a measurement circuit 601 configured to perform a plurality of measurements and a determiner 602 configured to determine a measurement gap configuration for the mobile terminal, wherein the measurement gap configuration includes a plurality of measurement gaps configured for the mobile terminal.

The mobile terminal 600 further includes a measurement controller 603 configured to associate each measurement of the plurality of measurements with at least one measurement gap of the measurement configuration and to control the measurement circuit 601 to carry out the measurement in the associated measurement gap.

The mobile terminal 600 further includes a communication circuit 604 configured to communicate the association of measurements with the measurement gaps with a network component.

In other words, a mobile terminal and a network component exchange information about the association of measurements with measurement gaps. For example, the mobile terminal may be configured to decide which measurements (e.g. RSTD measurements) to perform in which measurement gaps and to inform the network side about this decision. Alternatively, the network component may indicate to the mobile terminal which measurements are to be performed in which measurement gaps. Accordingly, the communication circuit may be configured to signal the association of measurements with the measurement gaps to the network component or it may be configured to receive the association of measurements with the measurement gaps from the network component and the measurement controller 603 may be configured to associate the measurements to measurement gaps accordingly.

For example, the interaction between the network side and the mobile terminal includes that the mobile terminal gives frequency selective feedback with respect to measurement gap request and measurement gap allocation. Thus, both network and mobile terminal may be aware of the associating between measurement gap, measurement report and measurement frequency (e.g. for an inter-frequency RSTD measurement).

Figure 7:
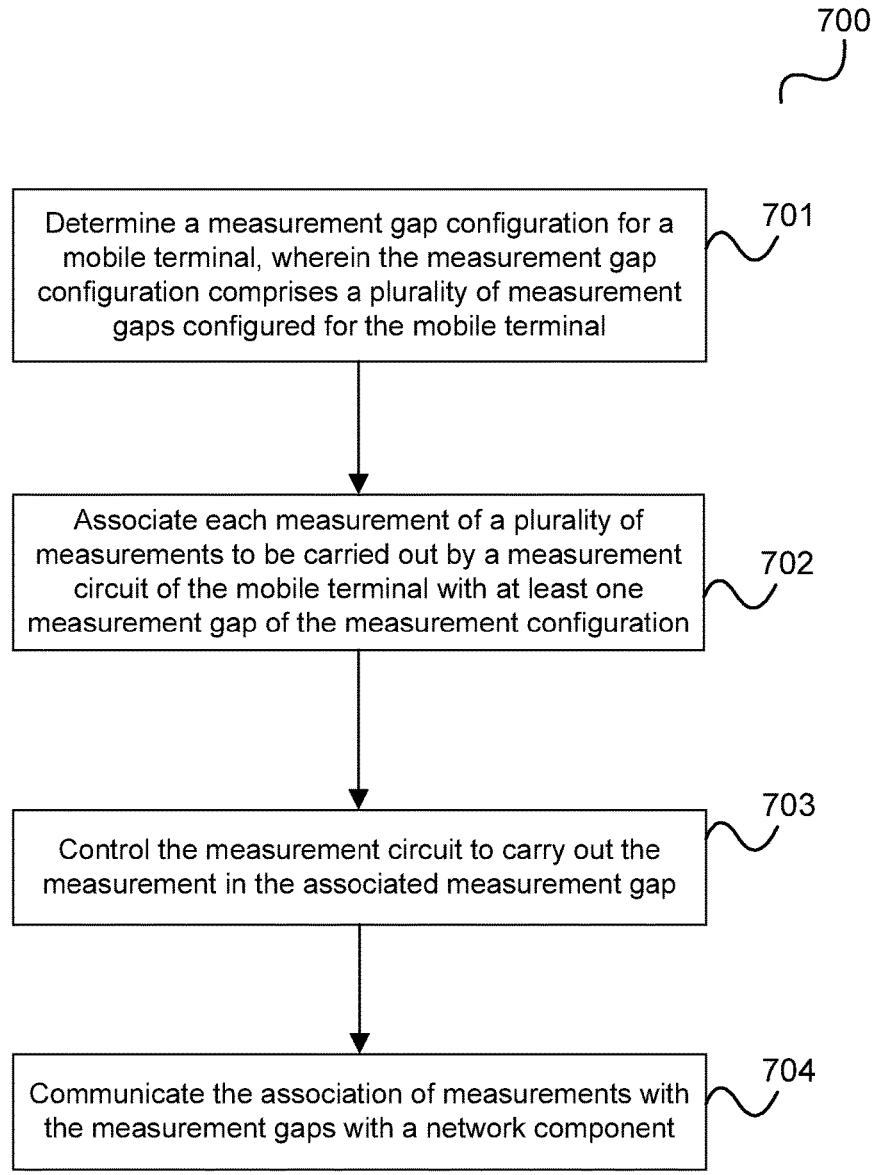
FIG. 7 shows a flow diagram illustrating a method for performing a measurement including communicating an association of measurements with measurement gaps with a network component.

The mobile terminal for example carries out a method as illustrated in FIG. 7.

FIG. 7 shows a flow diagram 700.

The flow diagram 700 illustrates a method for performing a measurement, for example carried out by a mobile terminal.

in 701, the mobile terminal determines a measurement gap configuration for the mobile terminal, wherein the measurement gap configuration includes a plurality of measurement gaps configured for the mobile terminal.

In 702, the mobile terminal associates each measurement of a plurality of measurements to be carried out by a measurement circuit of the mobile terminal with at least one measurement gap of the measurement configuration.

In 703, the mobile terminal controls the measurement circuit to carry out the measurement in the associated measurement gap.

In 704, the mobile terminal communicates the association of measurements with the measurement gaps with a network component.

It should be noted that 704 may be carried out before 703 in case the network component signals to the mobile terminal the association of measurements with the measurement gaps. 704 may be carried out after 703 in case the mobile terminal decides about the association of measurements with the measurement gaps and informs the network component accordingly. Accordingly, the method may include signaling the association of measurements with the measurement gaps to the network component or receiving the association of measurements with the measurement gaps from the network component and associating the measurements to measurement gaps accordingly.

Figure 8:
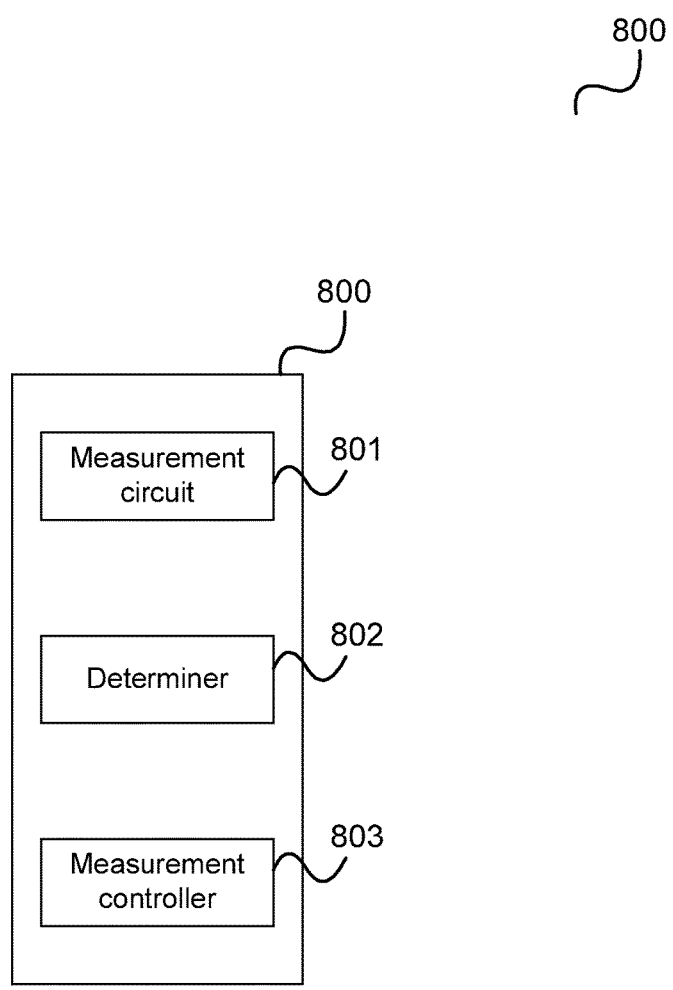
FIG. 8 shows a mobile terminal configured to associate measurements with measurement gaps based on information about signal qualities.

According to another example, a mobile terminal is provided as illustrated in FIG. 8.

FIG. 8 shows a mobile terminal 800.

The mobile terminal 800 includes a measurement circuit 801 configured to perform a plurality of measurements, wherein in each measurement, a signal is to be received, and a determiner 802 configured to determine a measurement gap configuration for the mobile terminal, wherein the measurement gap configuration includes a plurality of measurement gaps configured for the mobile terminal.

The mobile terminal 800 further includes a measurement controller 803 configured to associate each measurement of the plurality of measurements with at least one measurement gap of the measurement configuration based on information about the signal qualities of the signals to be received and to control the measurement circuit to carry out the measurement in the associated measurement gap.

In other words, a mobile terminal is configured to assign measurements to measurement gaps based on information about the quality of the signals to be received in the measurement. For example, a measurement may be assigned to another measurement gap position (e.g. an earlier measurement gap) in case that the signal to be received in the measurement has a better reception quality (at the mobile terminal) than the signals to be received in other measurements.

For example, the mobile terminal may perform an algorithm to schedule RSTD measurements based not only on priorities received from the network side but also based on additional parameters like signal quality and PRS occasion.

Figure 9:
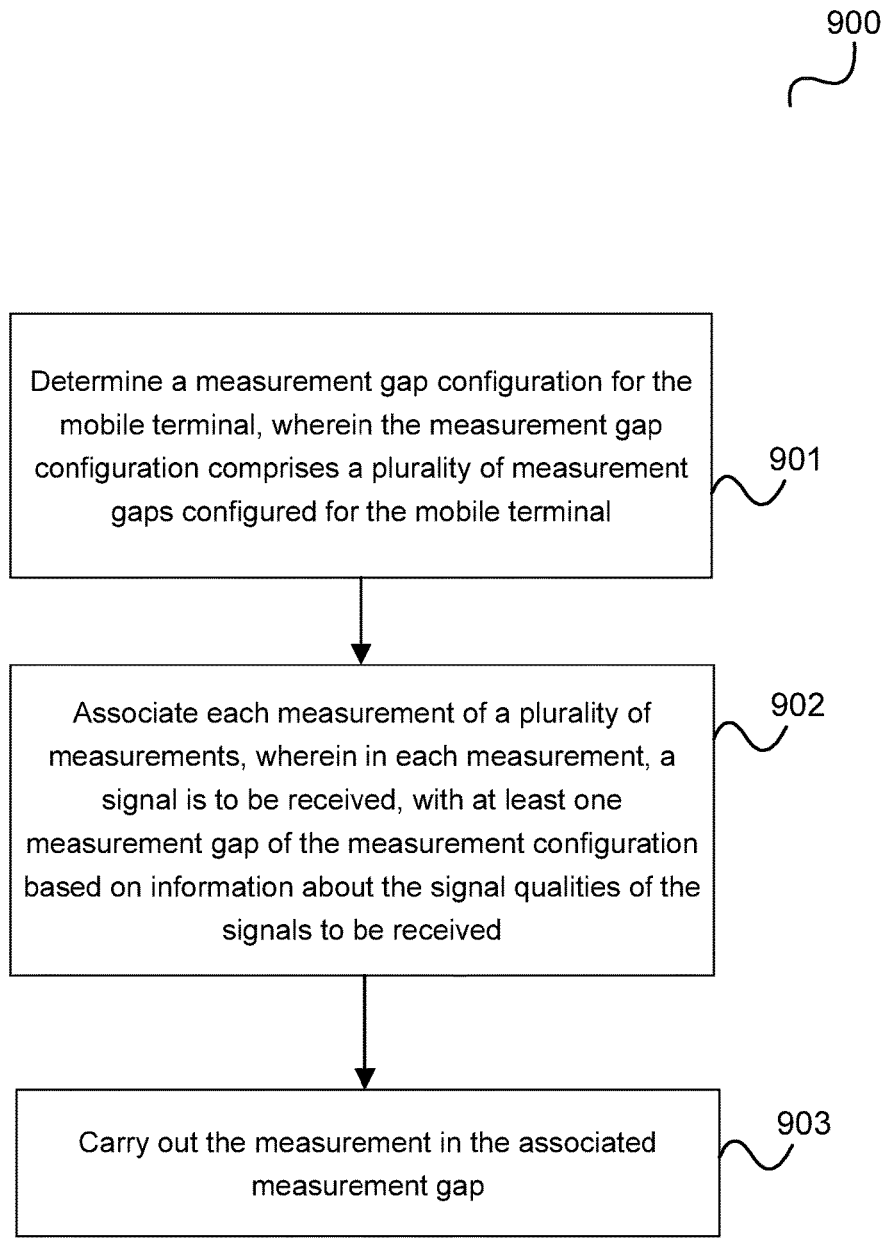
FIG. 9 shows a flow diagram illustrating a method for performing a measurement including associating measurements with measurement gaps based on information about signal qualities.

The mobile terminal for example carries out a method as illustrated in FIG. 9.

FIG. 9 shows a flow diagram 900.

The flow diagram 900 illustrates a method for performing a measurement, for example carried out by a mobile terminal.

In 901, the mobile terminal determines a measurement gap configuration for the mobile terminal, wherein the measurement gap configuration includes a plurality of measurement gaps configured for the mobile terminal.

In 902, the mobile terminal associates each measurement of a plurality of measurements, wherein in each measurement a signal is to be received, with at least one measurement gap of the measurement configuration based on information about the signal qualities of the signals to be received.

In 903, the mobile terminal carries out the measurement in the associated measurement gap.

The following examples pertain to further embodiments.

Example 1 is a mobile terminal as described with reference to FIG. 4.

In Example 2, the subject matter of Example 1 can optionally include the event being a handover of the mobile terminal.

In Example 3, the subject matter of Examples 1-2 can optionally include the event being a measurement gap reconfiguration for the mobile terminal. The measurement gap reconfiguration may for example be performed because of the measurement progress.

In Example 4, the subject matter of Examples 1-3 can optionally include the event being a connection reestablishment for the mobile terminal.

In Example 5, the subject matter of Examples 1-4 can optionally include the measurement including a plurality of signal measurements and the request for the measurement gap reconfiguration including a request for at least one measurement gap for each of the signal measurements.

In Example 6, the subject matter of Examples 1-5 can optionally include the measurement being a positioning measurement.

In Example 7, the subject matter of Examples 1-6 can optionally include the measurement being an Observed Time Difference of Arrival measurement.

In Example 8, the subject matter of Examples 1-7 can optionally include the measurement including a plurality of positioning signal measurements.

In Example 9, the subject matter of Examples 1-8 can optionally include the measurement including a plurality of Reference Signal Time Difference measurements.

In Example 10, the subject matter of Examples 1-9 can optionally include the measurement including a signal measurement at each of a plurality of different frequencies.

In Example 11, the subject matter of Examples 1-10 can optionally include the request for the measurement gap reconfiguration including a request for at least one measurement gap for each of the frequencies.

In Example 12, the subject matter of Examples 1-11 can optionally include a base station of a mobile communication network serving the mobile terminal.

In Example 13, the subject matter of Example 12 can optionally include the signaling circuit being configured to request the measurement gap reconfiguration from the base station.

In Example 14, the subject matter of Examples 12-13 can optionally include the base station serving the mobile terminal by means of a radio cell operated by the base station.

In Example 15, the subject matter of Example 14 can optionally include the measurement including a measurement for each of at least one neighboring radio cell of the radio cell.

In Example 16, the subject matter of Example 15 can optionally include each of the at least one neighboring radio cell having an associated frequency at which the measurement for the neighboring radio cell is to be carried out.

Example 17 is a method for performing a measurement as described with reference to FIG. 5.

In Example 18, the subject matter of Example 17 can optionally include the event being a handover of the mobile terminal.

In Example 19, the subject matter of Examples 17-18 can optionally include the event being a measurement gap reconfiguration for the mobile terminal.

In Example 20, the subject matter of Examples 17-19 can optionally include the event being a connection reestablishment for the mobile terminal.

In Example 21, the subject matter of Examples 17-20 can optionally include the measurement including a plurality of signal measurements and the request for the measurement gap reconfiguration includes a request for at least one measurement gap for each of the signal measurements.

In Example 22, the subject matter of Examples 17-21 can optionally include the measurement being a positioning measurement.

In Example 23, the subject matter of Examples 17-22 can optionally include the measurement being an Observed Time Difference of Arrival measurement.

In Example 24, the subject matter of Examples 17-23 can optionally include the measurement including a plurality of positioning signal measurements.

In Example 25, the subject matter of Examples 17-24 can optionally include the measurement including a plurality of Reference Signal Time Difference measurements.

In Example 26, the subject matter of Examples 17-25 can optionally include the measurement including a signal measurement at each of a plurality of different frequencies.

In Example 27, the subject matter of Example 26 can optionally include the request for the measurement gap reconfiguration including a request for at least one measurement gap for each of the frequencies.

In Example 28, the subject matter of Examples 17-27 can optionally include a base station of a mobile communication network serving the mobile terminal.

In Example 29, the subject matter of Example 28 can optionally include requesting the measurement gap reconfiguration from the base station.

In Example 30, the subject matter of Examples 28-29 can optionally include the base station serving the mobile terminal by means of a radio cell operated by the base station.

In Example 31, the subject matter of Example 30 can optionally include the measurement including a measurement for each of at least one neighboring radio cell of the radio cell.

In Example 32, the subject matter of Example 31 can optionally include each of the at least one neighboring radio cell having an associated frequency at which the measurement for the neighboring radio cell is to be carried out.

Example 33 is a mobile terminal as described with reference to FIG. 6.

In Example 34, the subject matter of Example 33 can optionally include the communication circuit being further configured to send a measurement report for each of the plurality of measurements.

In Example 35, the subject matter of Examples 33-34 can optionally include the communication circuit being configured to send the measurement reports separately.

In Example 36, the subject matter of Examples 33-35 can optionally include the communication circuit being configured to send a measurement report for one of the measurements at a time when one or more of the other measurements of the plurality of measurements are not yet completed.

In Example 37, the subject matter of Examples 33-36 can optionally include the measurements being positioning signal measurements.

In Example 38, the subject matter of Examples 33-37 can optionally include the measurements being Reference Signal Time Difference measurements.

In Example 39, the subject matter of Examples 33-38 can optionally include the network component being a base station serving the mobile terminal.

In Example 40, the subject matter of Examples 33-39 can optionally include the communication circuit being configured to receive an indication of the measurement gap configuration from the base station.

In Example 41, the subject matter of Examples 39-40 can optionally include the base station operating a radio cell and the measurements including a measurement for each of at least one neighboring radio cell of the radio cell.

In Example 42, the subject matter of Examples 33-41 can optionally include each of the at least one neighboring radio cell having an associated frequency at which the measurement for the neighboring radio cell is to be carried out.

Example 43 is a method for performing a measurement as described with reference to FIG. 7.

In Example 44, the subject matter of Example 43 can optionally include sending a measurement report for each of the plurality of measurements.

In Example 45, the subject matter of Examples 43-44 can optionally include sending the measurement reports separately.

In Example 46, the subject matter of Examples 43-45 can optionally include sending a measurement report for one of the measurements at a time when one or more of the other measurements of the plurality of measurements are not yet completed.

In Example 47, the subject matter of Examples 43-46 can optionally include the measurements being positioning signal measurements.

In Example 48, the subject matter of Examples 43-47 can optionally include the measurements being Reference Signal Time Difference measurements.

In Example 49, the subject matter of Examples 43-48 can optionally include the network component being a base station serving the mobile terminal.

In Example 50, the subject matter of Example 49 can optionally include receiving an indication of the measurement gap configuration from the base station.

In Example 51, the subject matter of Examples 49-50 can optionally include the base station operating a radio cell and the measurements including a measurement for each of at least one neighboring radio cell of the radio cell.

In Example 52, the subject matter of Examples 43-51 can optionally include each of the at least one neighboring radio cell having an associated frequency at which the measurement for the neighboring radio cell is to be carried out.

Example 53 is a mobile terminal as described with reference to FIG. 8.

In Example 54, the subject matter of Example 53 can optionally include the measurement controller being configured to associate each measurement of the plurality of measurements with at least one measurement gap of the measurement configuration such that if in a first measurement a first signal is to be received and in a second measurement a second signal is to be received and the signal quality of the first signal is higher than the signal quality of the second signal, the first measurement is performed before the second measurement.

In Example 55, the subject matter of Examples 53-54 can optionally include the measurement controller being configured to associate each measurement of the plurality of measurements with at least one measurement gap of the measurement configuration further based on a timing of the signals to be received.

In Example 56, the subject matter of Examples 53-55 can optionally include the signals being positioning signals.

In Example 57, the subject matter of Examples 53-56 can optionally include the measurements being Reference Signal Time Difference measurements.

In Example 58, the subject matter of Examples 53-57 can optionally include a receiver configured to receive an indication of the measurement gap configuration from a base station.

In Example 59, the subject matter of Examples 53-58 can optionally include the mobile terminal being served by a base station operating a radio cell and the measurements including a measurement for each of at least one neighboring radio cell of the radio cell.

In Example 60, the subject matter of Example 59 can optionally include each of the at least one neighboring radio cell having an associated frequency at which the measurement for the neighboring radio cell is to be carried out.

In Example 61, the subject matter of Example 60 can optionally include the information about the signal quality of a signal to be measured for a neighboring radio cell being the RSRQ or the RSRP of the neighboring radio cell.

Example 62 is a method for performing a measurement as described with reference to FIG. 9.

In Example 63, the subject matter of Example 62 can optionally include associating each measurement of the plurality of measurements with at least one measurement gap of the measurement configuration such that if in a first measurement a first signal is to be received and in a second measurement a second signal is to be received and the signal quality of the first signal is higher than the signal quality of the second signal, the first measurement is performed before the second measurement.

In Example 64, the subject matter of Examples 62-63 can optionally include associating each measurement of the plurality of measurements with at least one measurement gap of the measurement configuration further based on a timing of the signals to be received.

In Example 65, the subject matter of Examples 62-64 can optionally include the signals being positioning signals.

In Example 66, the subject matter of Examples 62-65 can optionally include the measurements being Reference Signal Time Difference measurements.

In Example 67, the subject matter of Examples 62-66 can optionally include receiving an indication of the measurement gap configuration from a base station.

In Example 68, the subject matter of Examples 62-67 can optionally include the mobile terminal is being served by a base station operating a radio cell and the measurements including a measurement for each of at least one neighboring radio cell of the radio cell.

In Example 69, the subject matter of Examples 62-68 can optionally include each of the at least one neighboring radio cell having an associated frequency at which the measurement for the neighboring radio cell is to be carried out.

In Example 70, the subject matter of Example 69 can optionally include the information about the signal quality of a signal to be measured for a neighboring radio cell being the RSRQ or the RSRP of the neighboring radio cell.

It should be noted that one or more of the features of any of the examples above may be combined with any one of the other examples. It should further be noted that for each of the methods a computer readable medium having recorded instructions thereon which, when executed by a processor, make the processor perform the method may be provided. Further, for each of the methods a mobile terminal including means for performing the various items of the method may be provided. Further, for a mobile terminal where it is applicable, a network component corresponding to the mobile terminal may be provided and a corresponding method for controlling a measurement (carried out by the network component) may be provided.

The components of the mobile terminals (e.g. the detector, the determiner, the signaling circuit, the measurement circuit, the measurement controller etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, examples are described in more detail. These may be seen as an extension of the 3GPP approach according to Rel 10.

According to the example described in the following, when the mobile terminal 105 should carry out a new OTDOA measurement it sends an initial request of an RSTD inter frequency measurement gap to the network (e.g. the E-UTRAN 101). Specifically, the mobile terminal 105 after reception of an OTDOA measurement request (including inter frequency measurements), checks whether the current gaps are sufficient. Following the outcome of the check the mobile terminal 105 distinguishes the following three cases a to c:

a. In case the measurements gaps as currently configured are sufficient for the OTDOA measurement the mobile terminal informs the network about how the measurement gaps currently assigned are used by the mobile terminal 105 (i.e. which inter frequency measurement is handled in which measurement gap). Thus the network is aware for the measurement gaps of the inter frequency RSTD measurements handled by the mobile terminal 105. A corresponding flow is illustrated in FIG. 10.

Figure 10:
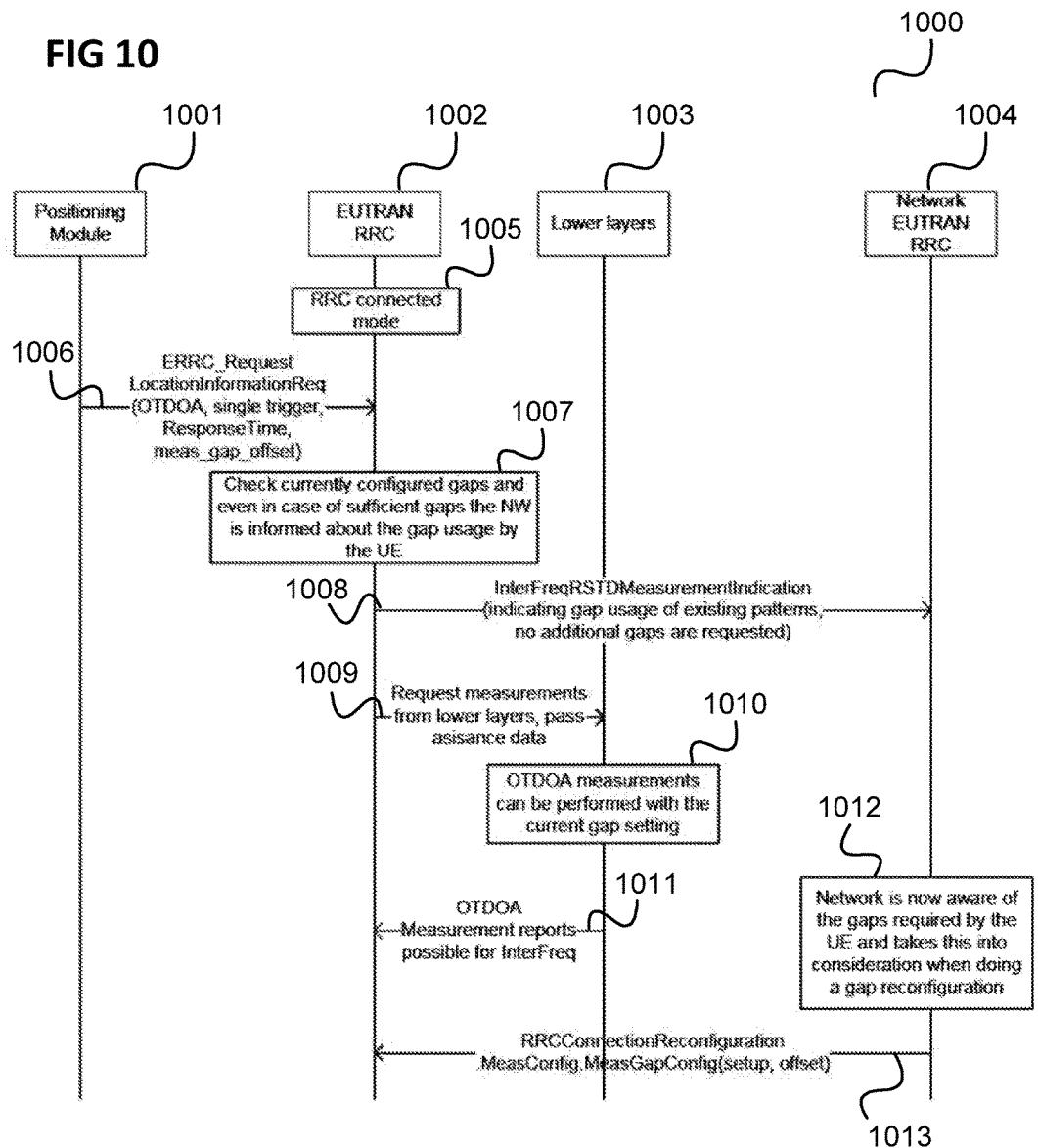
FIG. 10 shows a message flow diagram illustrating an example for an OTDOA measurement process in which the mobile terminal informs the network about the association of measurements with measurement gaps.

FIG. 10 shows a message flow diagram 1000.

Similarly to FIG. 2, the message flow takes place between a positioning module 1001, e.g. of the mobile terminal 105, a first RRC (Radio Resource Control) entity 1002 which is for example an entity of the RRC layer of the mobile terminal 105, lower layer entities 1003, which are for example entities of the data link layer or the physical layer of the mobile terminal 105, and a second RRC entity 1004 which is for example an entity of the RRC layer of the E-UTRAN 101.

1005 to 1007 are performed as 205 to 207 as explained above with reference to FIG. 2. It is assumed that the measurement gaps are suitable in this example.

In 1008, the first RRC entity 1002 sends an InterFreqRSTDMeasurementIndication message to the second RRC entity 1004 which indicates the gap usage of the current measurement gap configuration.

In 1009, the first RRC entity 1002 requests the lower layer entities 1003 to carry out the OTDOA measurement.

In 1010, the lower layer entities 1003 carry out RSTD measurements with the current measurement gap setting and reports the results to the first RRC entity in 1011.

It is assumed that at some point in time, in 1012, the second RRC entity 204 decides to change the measurement gap configuration. However, the second RRC entity is because of the InterFreqRSTDMeasurementIndication message of 1008 aware of the measurement gap usage and aware of which measurement gaps are needed by the mobile terminal. Accordingly, it can select a new measurement gap configuration which is still suitable for the OTDOA measurement.

In 1013, the second RRC entity informs the first RRC entity about the new measurement gap configuration.

In case the measurement gaps are not sufficient for the OTDOA measurement the mobile terminal requests gaps for each inter-frequency frequency included in the OTDOA measurement request. Following the request the network assigns measurement gap patterns to the mobile terminal together with the indication, for each assigned measurement gap pattern, for which frequency the pattern is to be used, i.e. to which frequency it is assigned. The network may assign the same gap to several frequencies in case the PRS scheduling of the frequencies fits the gap. The mobile terminal may request the measurement gaps for different inter-frequencies sequentially. This allows keeping the overall impact on the network capacity low at the cost of possibly prolonging the duration for the measurement execution. An example for a corresponding flow is shown in FIG. 11.

Figure 11:
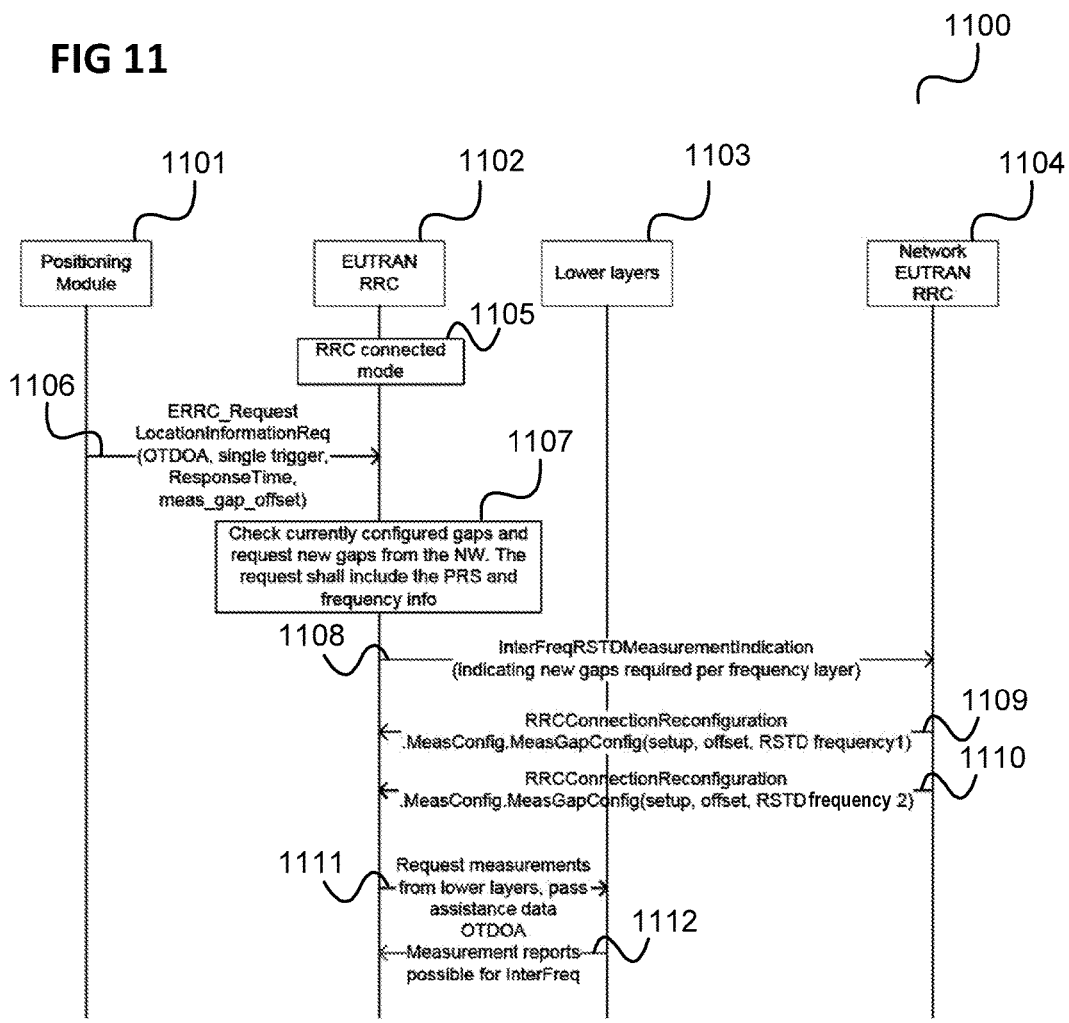
FIG. 11 shows a message flow diagram illustrating an example for an OTDOA measurement process in which in which the network indicates an association of measurement gaps with measurements.

FIG. 11 shows a message flow diagram 1100.

Similarly to FIG. 2, the message flow takes place between a positioning module 1101, e.g. of the mobile terminal 105, a first RRC (Radio Resource Control) entity 1102 which is for example an entity of the RRC layer of the mobile terminal 105, lower layer entities 1103, which are for example entities of the data link layer or the physical layer of the mobile terminal 105, and a second RRC entity 1104 which is for example an entity of the RRC layer of the E-UTRAN 101.

1105 to 1107 are performed as 205 to 207 as explained above with reference to FIG. 2. It is assumed that the measurement gaps are not suitable in this example.

In 1108, the first RRC entity sends an InterFreqRSTDMeasurementIndication message wherein it indicates the frequencies for which the mobile terminal requires measurement gaps.

Assuming that the mobile terminal requires measurement gaps for a first frequency and a second frequency, the second RRC entity 1104 sends a first RRCConnectionReconfiguration message in 1109 indicating a measurement gap pattern for the first frequency and a second RRCConnectionReconfiguration message in 1110 indicating a measurement gap pattern for the second frequency.

It should be noted that 1109 and 1110 can be seen as the network (i.e. the second RRC entity 1104) indicating the association of measurement gaps with measurements (namely in this case of measurement gaps with frequencies).

In 1111, the first RRC entity 1102 requests the lower layer entities 1103 to carry out the OTDOA measurement.

The lower layer entities 1103 carry out RSTD measurements with the current measurement gap setting and report the results to the first RRC entity in 1112.

c. In case the gaps are sufficient for one frequency but not for another frequency a combination of the approaches for cases a and b is used.

Further, according to the present example, the mobile terminal may give feedback (e.g. if necessary) to the network in case of changing network environment. For example, in case of a handover the mobile terminal rechecks the requirements for RSTD inter frequency gaps and informs the base station operating the new cell about required measurement gaps.

For instance, an inter frequency handover could have occurred and thus a new measurement gap pattern needs to be allocated to the mobile terminal or parts of the RSTD inter frequency measurements are completed (e.g. the complete RSTD measurements on a single inter-frequency have been completed) and thus only a reduced set of measurement gaps is required. An example for a corresponding flow is shown in FIG. 12.

Figure 12:
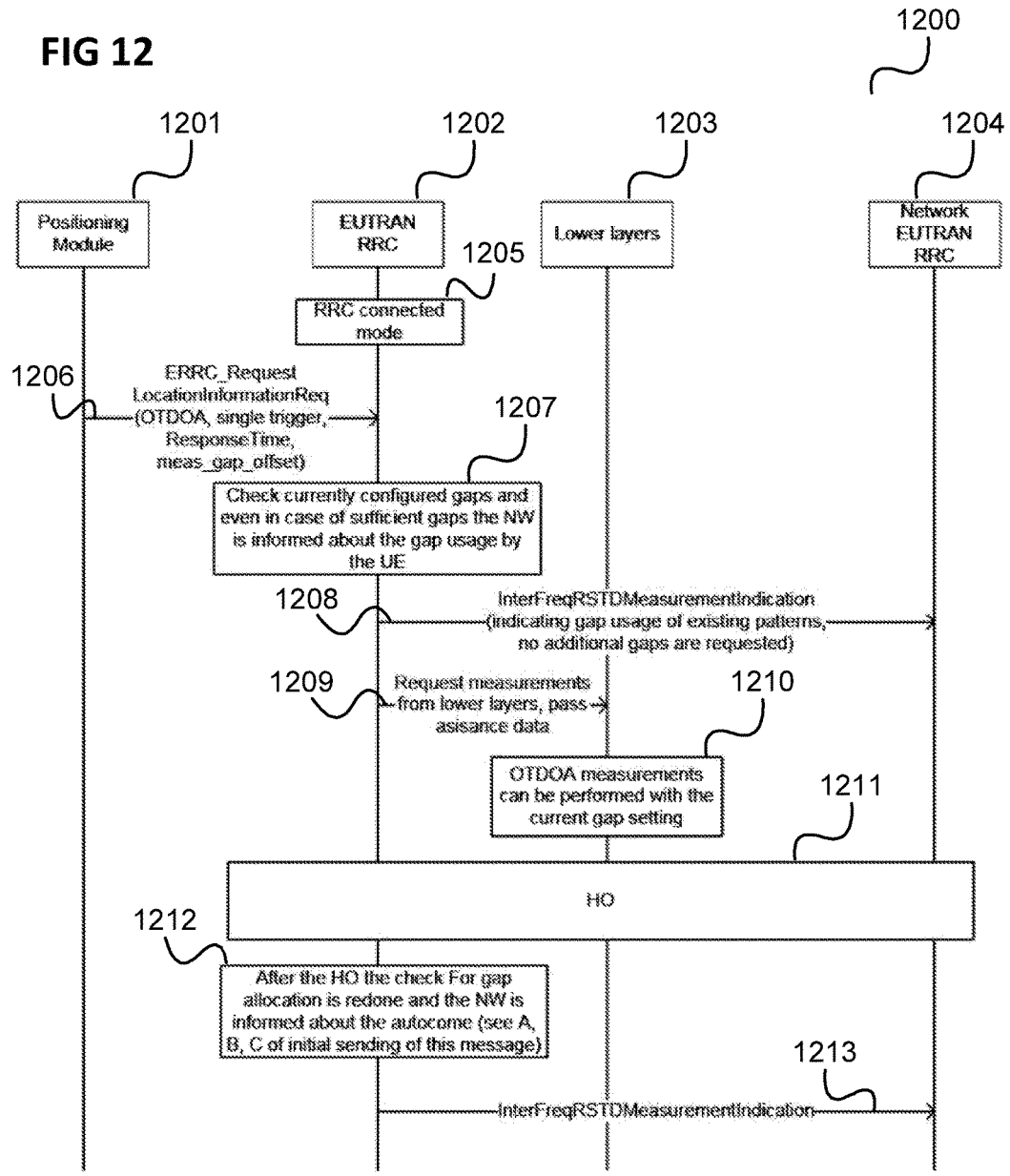
FIG. 12 shows a message flow diagram illustrating an example for an OTDOA measurement process in case of a handover.

FIG. 12 shows a message flow diagram 1200.

Similarly to FIG. 2, the message flow takes place between a positioning module 1201, e.g. of the mobile terminal 105, a first RRC (Radio Resource Control) entity 1202 which is for example an entity of the RRC layer of the mobile terminal 105, lower layer entities 1203, which are for example entities of the data link layer or the physical layer of the mobile terminal 105, and a second RRC entity 1204 which is for example an entity of the RRC layer of the E-UTRAN 101.

1205 to 1210 are performed as 1002 to 1010 of the flow illustrated in FIG. 10.

In this example, it is assumed that in some point in time, in 1211, a handover procedure is carried out and that as a result, the measurement configuration changes.

In 1212, when the mobile terminal has detected that a handover has taken place, the first RRC entity 1202 again checks whether the changed measurement configuration is suitable for the OTDOA measurement.

In 1213, depending on the result of the check in 1212, the first RRC entity 1202 sends an InterFreqRSTDMeasurementIndication message to the second RRC entity 1004 as in 1008 of FIG. 10 or as in 1108 of FIG. 11 (or a combination as in case c above).

Further, in the present example, the mobile terminal 105 may deconfigure measurement gaps that it no longer requires for the OTDOA measurement.

It may for example occur that it may be beneficial for the mobile terminal to allocate the measurement gaps for each inter-frequency sequentially (as mentioned above). In this case the mobile terminal may inform the network that a measurement gap is no longer required and a new measurement gap is requested. This is illustrated in FIG. 13.

FIG. 13 shows a message flow diagram 1300.

The message flow takes place between a mobile terminal 1301 (e.g. corresponding to mobile terminal 105) and an E-UTRAN 1302 for example corresponding to E-UTRAN 101.

It is assumed that the mobile terminal requires measurement gaps for a first frequency and a second frequency.

In 1303, the mobile terminal 1301 sends a first RRCConnectionReconfiguration message with a request for measurement gaps for RSTD measurements at the first frequency.

In 1304, the E-UTRAN 1302 sends an RRCConnectionReconfiguration message indicating a measurement gap pattern for the first frequency, i.e. to be used for RSTD measurements at the first frequency.

In 1305, the mobile terminal 1301 performs the RSTD measurements at the first frequency.

In 1306, the mobile terminal 1301 sends a first RRCConnectionReconfiguration message with a request for measurement gaps for RSTD measurements at the second frequency. By requesting measurement gaps only for RSTD measurements at the second frequency, the mobile terminal 1301 in effect requests removal of the measurement gaps for the first frequency.

In 1307, the E-UTRAN 1302 sends an RRCConnectionReconfiguration message indicating a measurement gap pattern for the second frequency, i.e. to be used for RSTD measurements at the second frequency.

It should be noted that 1304 and 1307 can be seen as the network (i.e. the E-UTRAN 1302) indicating the association of measurement gaps with measurements (namely in this case of measurement gaps with frequencies).

The mobile terminal 1301 can then perform the RSTD measurements at the second frequency.

Further, when the OTDOA measurement is finished, the mobile terminal may release all measurement gaps.

Further, in the present example, the mobile terminal may request measurement gaps in order of priorities. For example, the mobile terminal may request measurement gaps for different frequencies in sequence. The order is for example determined by an algorithm taking a priority provided by the network and measurements by the mobile terminal like RSRQ (Reference Signal Received Quality) and RSRP (Reference Signal Received Power) of cells for which a PRS is to be received into account.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A user equipment device comprising:
   a measurement circuit configured to perform a plurality of measurements;
   a determiner configured to determine a measurement gap configuration for the user equipment device, wherein the measurement gap configuration comprises a plurality of measurement gaps configured for the user equipment device;
   a measurement controller configured to associate each measurement of the plurality of measurements with at least one measurement gap of the measurement gap configuration and to control the measurement circuit to carry out the measurement in an associated measurement gap; wherein the measurement controller is configured to associate each measurement of the plurality of measurements with at least one measurement gap of the measurement gap configuration such that if in a first measurement a first signal is to be received and in a second measurement a second signal is to be received and the signal quality of the first signal is higher than the signal quality of the second signal, the first measurement is performed before the second measurement;
   a communication circuit configured to communicate the association of measurements with the plurality measurement gaps to a network component.

2. The user equipment device of claim 1, wherein the communication circuit is further configured to send a measurement report for each of the plurality of measurements.

3. A user equipment device comprising:
   a measurement circuit configured to perform a plurality of measurements, wherein in each measurement, a signal is to be received;
   a determiner configured to determine a measurement gap configuration for the user equipment device, wherein the measurement gap configuration comprises a plurality of measurement gaps configured for the user equipment device; and
   a measurement controller configured to associate each measurement of the plurality of measurements with at least one measurement gap of the measurement gap configuration based on information about the signal qualities of an signals to be received and to control the measurement circuit to carry out the measurement in the associated measurement gap;

wherein the measurement controller is configured to associate each measurement of the plurality of measurements with at least one measurement gap of the gap measurement configuration such that if in a first measurement a first signal is to be received and in a second measurement a second signal is to be received and the signal quality of the first signal is higher than the signal quality of the second signal, the first measurement is performed before the second measurement.

4. A user equipment device comprising:

a measurement circuit configured to perform a plurality of measurements, wherein in each measurement, a signal is to be received;

a determiner configured to determine a measurement gap configuration for the user equipment device after a handover has occurred, wherein the measurement gap configuration comprises a plurality of measurement gaps configured for the user equipment device;

a measurement controller configured to associate each measurement of the plurality of measurements with at least one measurement gap of the measurement gap configuration based on information about the signal qualities of the signals to be received and to control the measurement circuit to carry out the measurement in an associated measurement gap;

wherein the measurement controller is configured to associate each measurement of the plurality of measurements with at least one measurement gap of the measurement gap configuration such that if in a first measurement a first signal is to be received and in a second measurement a second signal is to be received and the signal quality of the first signal is higher than the signal quality of the second signal, the first measurement is performed before the second measurement; and wherein the user equipment device is configured to receive a measurement gap reconfiguration from the network component after the handover where the measurement gap reconfiguration incorporates the measurement gap configuration determined by the determiner of the user equipment device.

5. The user equipment device of claim 3, wherein the communication circuit is further configured to send a measurement report for each of the plurality of measurements.

* * * * *